No. 836,380. PATENTED NOV. 20, 1906.
W. A. HENDRYX.
PROCESS OF TREATING ORES.
APPLICATION FILED SEPT. 20, 1904.

Witnesses:
G. Sargent Elliott.
Bessie Thompson

Inventor:
By Wilbur Alson Hendryx
H. S. Bailey, Attorney

No. 836,380. PATENTED NOV. 20, 1906.
W. A. HENDRYX.
PROCESS OF TREATING ORES.
APPLICATION FILED SEPT. 20, 1904.

No. 836,380. PATENTED NOV. 20, 1906.
W. A. HENDRYX.
PROCESS OF TREATING ORES.
APPLICATION FILED SEPT. 20, 1904.

Witnesses:
G. Sargent Elliott.
Bessie Thompson

Inventor:
Wilbur Alson Hendryx
By H. S. Bailey, Attorney.

UNITED STATES PATENT OFFICE.

WILBUR A. HENDRYX, OF LOS ANGELES, CALIFORNIA.

PROCESS OF TREATING ORES.

No. 836,380.　　　　Specification of Letters Patent.　　　　Patented Nov. 20, 1906.

Application filed September 20, 1904. Serial No. 225,246.

*To all whom it may concern:*

Be it known that I, WILBUR A. HENDRYX, a citizen of the United States of America, residing at Los Angeles, in the county of Los Angeles and State of California, have invented certain new and useful Improvements in Processes for Treating Ores; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new and improved process for extracting gold, silver, copper, and other metals from ores as they are found in nature; and the objects of my process are, first, to extract the metallic values from finely crushed, ground, and pulverized ores as they are found in nature by means of the combined use of chemical solutions, agitation, aeration, electrical precipitation, and concentration; second, to provide a process for the recovery of the metallic values of ores by two different methods and applications of restrengthened cyanid or other chemical solutions and by agitation, aeration, and electrolytic deposition; third, to provide a process in which ore is recrushed and reground and pulverized in cyanid solutions after being broken up in the rock-breaker; fourth, to provide a process in which the ore after being recrushed in the chemical solutions is then treated by amalgamation in order that a percentage of the free gold and silver values may be recovered from the ores; fifth, to provide a process in which the ore is first reduced in chemical solutions to a suitable chemical ore-pulp solution and is then treated by amalgamation and is then ground and pulverized in cyanid or other solutions or in cyanid and other solutions and is then run into combined ore-pulp settling and classifying tanks and is settled, and the surplus solution is returned to the ore-recrushing battery stock-solution-supply tank, and the ore-pulp, with such solution as permeates it, is conveyed to an agitating and electrical-treatment tank, and is mixed in this agitating and electrical-treatment tank with a fresh supply of cyanid or with any other suitable chemical or chemicals than cyanid or with cyanid and other chemicals, depending on the character of the metallic compounds of the ore that it is required to dissolve and that is adapted to assist the electrolytic action of suitable electrodes, thereby forming a restrengthened chemical ore-pulp solution than that used to recrush, grind, and pulverize the ore in; sixth, to provide a process in which the ore-pulp solutions are treated in a tank in which the ore-pulp is moved in contact with electrolytic electrodes that are adapted to collect the metallic values from the chemical ore-pulp solutions; seventh, to provide a process in which after such of the metallic values as can be saved by amalgamation and electrical precipitation in suitable chemical ore-pulp solutions have been extracted from the ore-pulp the ore-pulp is subjected to further treatment by concentration to recover such particles of the minerals as are too coarse to be penetrated and dissolved by the chemical ore-pulp solutions and that the amalgamation treatment did not collect or that are insoluble in the chemical solutions used; eighth, to provide a process in which ores are continuously fed and recrushed after passing through a rock-breaker and are then reground and repulverized continuously in cyanid or other chemical solutions and the resulting ore-pulp amalgamated and then run into settling and classifying tanks adapted to divide the ore-pulp into different-sized grades of ore-pulp from the largest to the finest slimes and in which the clear solution in the settling and classifying tanks is then returned to the ore crushing and grinding and pulverizing machinery and in which a charge of ore-pulp is then drawn from the different-sized classified ore-pulps from the settling and classifying tanks and run into an agitating and aerating and electrical precipitation tank and mixed with a restrengthened charge of cyanid or with any other chemical or chemicals to bring the resulting chemical ore-pulp solution up to the desired consistency in a fixed charge of the tonnage capacity of the tank in which said fixed charge is agitated and aerated and the metallic values of the ores are extracted by electrolytic deposition, and to regenerate the chemical solutions, and then the chemical ore-pulp solutions are run into settling-tanks, and the solution is decanted or separated from the ore-pulp and is pumped back into the re-crushing and grinding machinery, and the remaining ore-pulp is carried to further treatment by concentration; ninth, to provide a process in which the ore-pulp is mixed with chemical solvents into a chemical ore-pulp solution that is capable of decomposing the soluble compounds of the ore-pulp, separate the metals therefrom, and to facilitate the electrolytic action thereof and deposit the metals directly on suitable electrodes and to regenerate the chemical solutions; tenth, to provide an electrochemical process for the extraction of the metallic values of ores in which ores are reduced to ore-pulp and are formed into a chemical ore-pulp solution which is kept in continuous movement for a predetermined period of time in fixed charges and is distributed in a continuously-moving thin sheet in contact with the atmosphere and in which the continuously-moving ore-pulp is brought in contact with suitable electrolytic electrodes that are adapted to collect the metallic values in the chemical ore-pulp solutions; eleventh, to provide a process in which the ores are first pulverized in cyanid solutions or other chemical solutions to start and establish a chemical action that will prepare the ore-pulp for the electrical precipitation of its metals in subsequent treatment, then to amalgamate said ore-pulp, then to settle and classify, and to chemically treat said ore-pulp to destroy any acid salts present therein detrimental to the solvent action of cyanid or other chemical solutions, then to separate the clear cyanid or other chemical solutions from the ore-pulp and return it to the ore recrushing and pulverizing machinery's solution-supply tank, then to mix said ore-pulp in fixed charges with restrengthened cyanid or any other suitable chemical or chemicals or with cyanid and other chemicals, then to heat said chemical ore-pulp solution, then to agitate by moving said chemical ore-pulp solutions in a continuous stream for a predetermined period of time and at the same time to aerate by distributing said continuous-moving chemical ore-pulp solution in a thin stream in contact with the atmosphere, then at the same time flowing said chemical ore-pulp solution in contact with suitable electrolytic electrodes until they have collected a satisfactory percentage of the said chemical ore-pulp solution's metallic values, then settling and decanting or separating the chemical solutions from the ore-pulp, and then conveying the said chemical solutions to the recrushing and pulverizing machinery's chemical-solution-supply tank, and then running the settled ore-pulp to waste or to further treatment, as desired; twelfth, to provide a process in which the ores are first pulverized in cyanid solutions or other chemical solutions or in cyanid and other chemical solutions to start and establish a chemical action that will facilitate the recovery of the free particles of the minerals in the ore-pulp by amalgamation and that will prepare the chemical ore-pulp solution for the electrical precipitation of its metals in subsequent treatment, then to amalgamate said ore-pulp solution, then to settle and classify and to chemically treat said ore-pulp solution to destroy any acid salts present therein detrimental to the solvent action of cyanid or other chemical solutions, then to separate the clear cyanid or other chemical solutions from the ore-pulp and return it to the ore-recrushing and pulverizing machinery's chemical-solution-supply tank, then to mix said ore-pulp in fixed charges with restrengthened cyanid or other chemical solutions or with cyanid and other chemical solutions, then to heat said fixed charges, then to agitate said chemical pulp solutions by moving them in a con-ore-tinuous stream for about from two hours' to about twelve hours' time and at the same time to aerate by distributing said continuous-moving chemical ore-pulp solutions in a thin conical-shaped stream in contact with the atmosphere, then at the same time flowing said chemical ore-pulp solutions in contact with suitable electrolytic electrodes until they have collected all they can collect of the said chemical ore-pulp solution's metallic values, then settling and decanting or separating the chemical solutions from the ore-pulp, and then conveying the said chemical solutions to the recrushing and pulverizing machinery's chemical-solution-supply tank, and then concentrating the settled ore-pulp.

While any suitable mechanism may be employed to practically operate my process, I have illustrated the preferred construction and arrangement of such apparatus as is necessary to a full and complete reduction to practice of my process on a thoroughly practical and economic basis.

In the illustrations.

Figure 1:
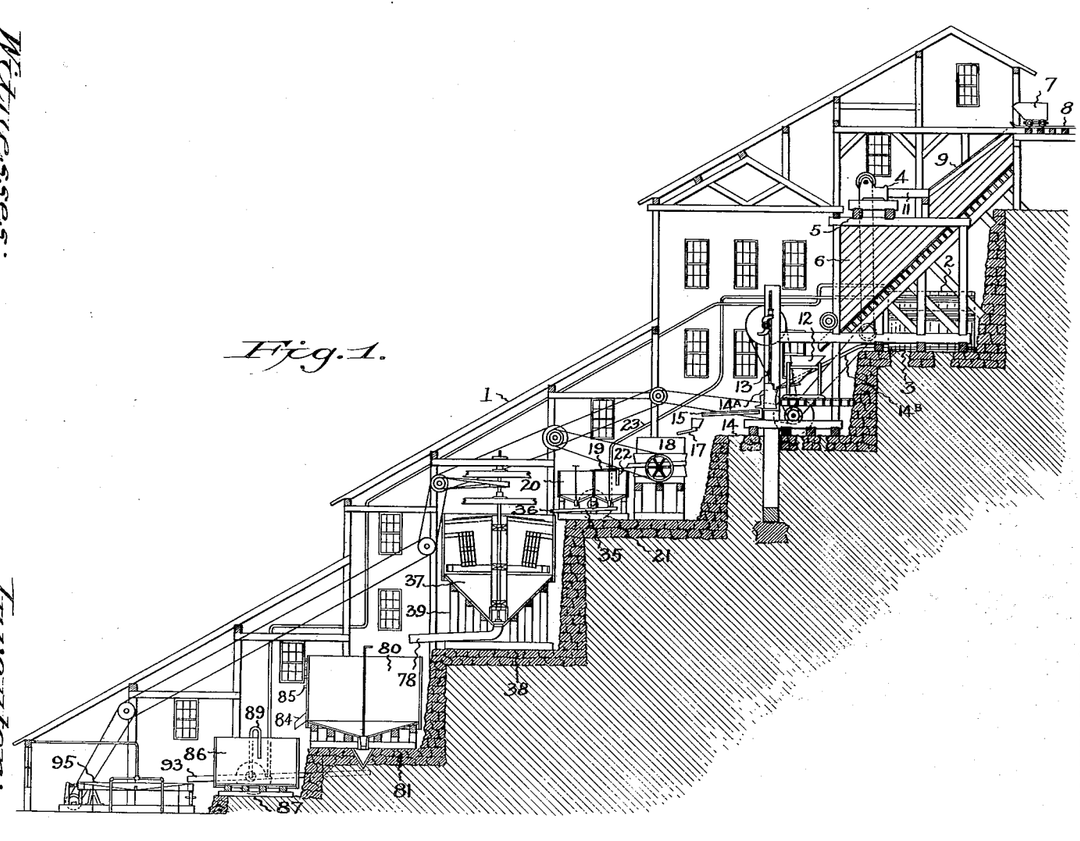
Figure 1 is a sectional elevation of a complete ore-treating mill embodying the machinery I preferably use in operating my process.
Figures 2, 4, 5, 6:
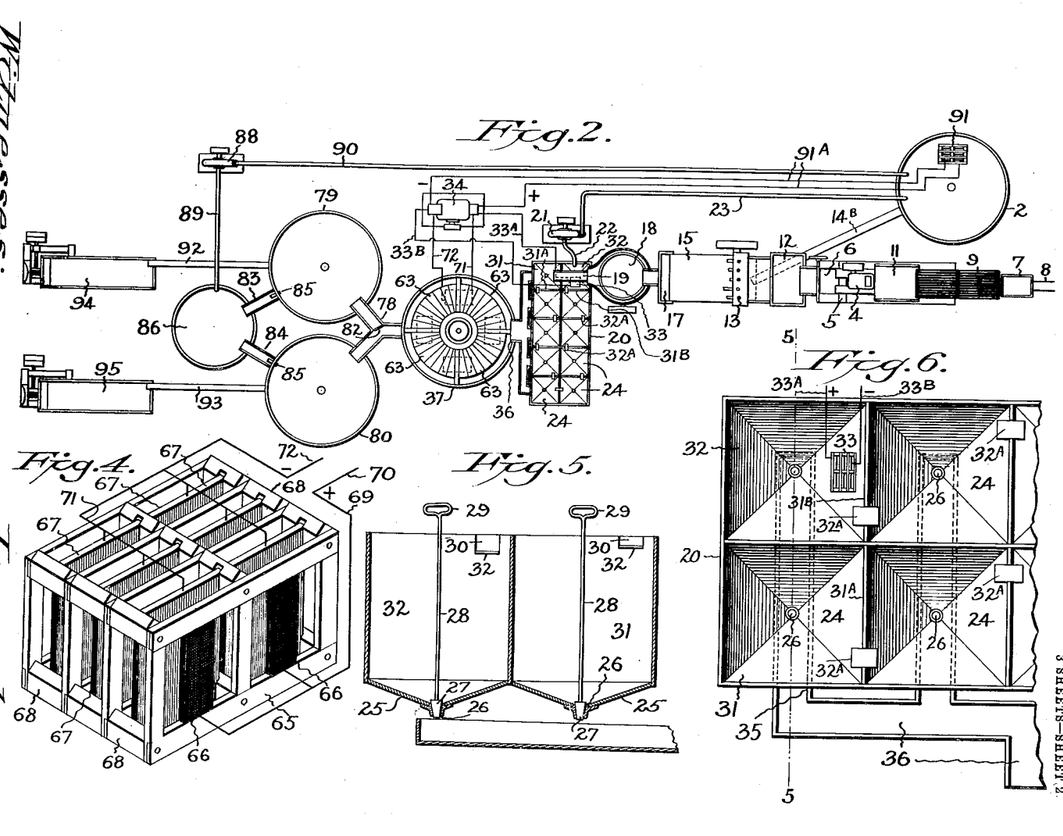
Fig. 2 is a plan view of the various machines and their coöperative arrangement shown in Fig. 1. The building, the machine-driving belts, and the pulleys and shafting of Fig. 1 are not shown, to avoid confusion.
Fig. 4 is a perspective view of the electrical-precipitation electrodes, showing the anodes and cathodes arranged in a group in a supporting-frame.
Fig. 5 is a section, on line 5 5 of Fig. 6, of a pair of compartments of the ore-pulp settling and classifying tank.
Fig. 6 is an enlarged plan view of a fragment of the ore-pulp settling and classifying tank, a complete sectional elevation and plan of which are shown on a smaller scale in the mill in Figs. 1 and 2, respectively.

Referring to drawings, the numeral 1 designates a section of a sidehill mill-building, which consists of suitable floors, studs, trusses, and roofs, as shown. At the top portion of the upper end of the mill I place a tank 2 on the upper floor 3, which I term the "battery-solution-supply" tank. This tank is of ample capacity to hold a quantity of any suitable chemical solution sufficient for the requirements of the ore recrushing, grinding, and pulverizing machinery of the mill, which may consist of stamps, rolls, or any of the roller or ball mills that are in use and are adapted to recrush, grind, and pulverize ore. In all cases, however, when the ore consists of large lumps of rock the ore is broken up into small pieces by a rock-breaker and stored in bins. Consequently I illustrate a rock-breaker 4 in the top of the mill. This rock-breaker is supported by a timber-frame 5 above an ore-bin 6, which is formed below it. The ore is delivered to the rock-breaker by a car 7, that is mounted on a track 8 and delivers ore from mine-workings, which I do not illustrate. The ore is discharged from the car onto a grizzly 9, which sifts the coarse lumps from the finer material. The finer material drops through the grizzly into the ore-bin 6. The coarse lumps run over the grizzly to a platfrom 11 and are fed to the rock-breaker 4 by an attendant. The crushed material falls into the bin 6, from which it is discharged into the automatic ore-feeder 12, which feeds it gradually into the recrushing machinery, which, as illustrated, consists of stamps 13. These stamps and their supporting-timbers are positioned on the floor 14 of the mill, which is enough lower than the solution-supply tank to allow the chemical solutions to flow to the mortar 14$^A$ of the stamps, through a pipe 14$^B$, which extends from the bottom of the tank 2 to the mortar, where it is mixed with the ore in sufficient quantity to form with the pulverized ore a chemical ore-pulp solution which is thin enough to swash through the screens of the mortar, which may vary from about twenty to one hundred mesh, the size of the screens determining the size of the mesh of the ore.

From the mortar of the stamps the chemical ore-pulp solution is preferably subjected to an amalgamation treatment, which preferably consists of running the chemical ore-pulp solution over an amalgamated surface, which preferably consists of an amalgamated plate 15, or, if desired, a plurality of amalgamated plates may be used.

The amalgamation treatment is given to catch the coarse gold and silver the chemical solution has put in an amalgamating condition and that settles on the amalgamated plate. This amalgamated plate is arranged to deliver the chemical ore-pulp solution into a suitable launder 17, which conveys it to the grinding and pulverizing machinery, which, as illustrated, consists of a Chilian mill 18, in which the chemical ore-pulp is ground and pulverized to any desired degree of fineness.

From the Chilian mill the ore-pulp is given a second amalgamation treatment, preferably by flowing it over an amalgamated plate 19, where a percentage of the free particles of gold and silver that have been freed by the further grinding and pulverizing of the chemical ore-pulp solution in the Chilian mill and that have been put in condition to amalgamate by the chemical solution and that settles on the plate will amalgamate with it. In case rolls are used to recrush the broken rock from the ore-bin the amalgamation treatment that follows the Chilian mill or other grinding and pulverizing machinery is the only amalgamation treatment the chemical ore-pulp solution receives. Consequently an amalgamating-plate of area enough should be used to take the product of both the recrushing and grinding and pulverizing machinery. From the amalgamated plate 19 the solution flows into a settling and classifying-tank 20. This settling and classifying tank may be of any suitable construction that is adapted to settle and classify the ore-pulp into different sizes from the coarsest particles it contains to the finest slimes, and as the ore-pulp settles the chemical solution is clarified until it is substantially clear. The chemical solution is then pumped back by a pump 21 to the stock-solution tank 2, as the pump 21 is connected to one compartment of the tank by a suction-pipe 22 and to the stock-solution tank 2 by a delivery-pipe 23. This settling and classifying tank is preferably made of large enough capacity to keep the recrushing and grinding and pulverizing machinery in continuous operation and to receive and store their product. The several different-graded sizes of settled and classified ore-pulp are then drawn from the various compartments of the settling and classifying tank in sufficient quantities from each, from the coarsest to the finest slimes, to make a charge of the desired quantity and consistency of ore-pulp, which of course depends on the character of the ore under treatment, as some ores slime more than others in grinding and pulverizing, and the object in thus classifying and drawing the ore-pulp off in charges is to enable the mill operator to select a charge that will be properly balanced as to its constituency of coarse middlings, fines, and slimes, so that neither one of the intermediate sizes of the particles of the ore-pulp will unduly predominate in the substantially quantitative charges that are drawn from it. While almost any one of the well-known types of settlers and classifiers can be used for settling and classifying the chemical ore-pulp solution, I preferably use the settling and classifying multiple-compartment tank illustrated in Figs. 2, 5, and 6, which I have designed especially for this purpose and which I preferably construct as follows: I make the settler and classifier tank 20 of square box-shape form at its top and divide it into compartments 24 and arrange each pair of compartments in alinement with the flow of the chemical ore-pulp solution through the mill. I illustrate five pairs of compartments in Fig. 2, each compartment of which is provided with an inverted pyramidal bottom 25, (see Figs. 5 and 6,) the inverted apex of which is provided with a discharge-aperture 26, in which is operatively fitted a valve 27, which is provided with a valve-rod 28, the upper end of which is provided with a handle 29 to enable the valve to be withdrawn by an attendant. The chemical ore-pulp solution flows from one compartment to another through slots 30, which are cut in each partition between each two compartments, and each slot is cut a little deeper in the next partition than in the one preceding it, commencing at the partition 31$^A$ and extending around the tank to the partition 31$^B$ between the last two compartments. A short flat board 32$^A$ is secured at its center to the bottom of each slot and extends on each side of each partition into each adjacent compartment. The ore-pulp flows over these boards in flowing from one compartment to another through the slots 30.

Figure 3:
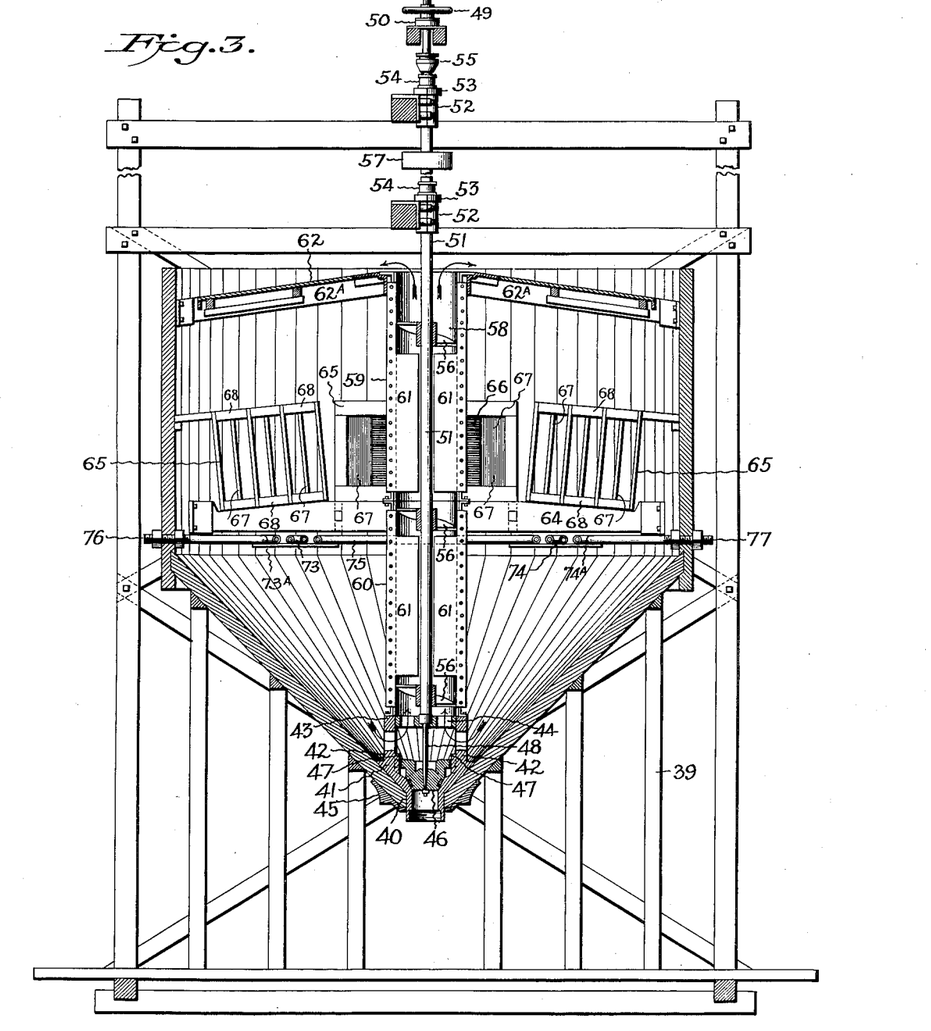
Fig. 3 is a vertical section of the chemical ore-pulp agitating, aerating, and electrical-precipitation tank and its supporting-timbers.

I preferably extend the amalgamation-plate 19 from the Chilian mill over the farthest tank from the Chilian mill, and the chemical ore-pulp solution then flows into the compartment 31 of the settling and classifying tank. From this compartment it flows through the lower row of tanks and from them into and along the row of compartments next to the Chilian mill to the compartment 32. When the solution reaches the last compartment 32, it is practically clear. To this compartment 32 I connect the suction-pipe 22 of the pump 21 and pump the solution of all the compartments from this compartment. When treating ores that carry a considerable percentage of their values in soluble gold, I place in this compartment 32 electrolytic electrodes 33, that are adapted to collect a percentage of the metallic values from the chemical solution, and which I operatively connect by suitable circuit-wires 33$^A$ and 33$^B$ to an electric generator 34, and, if desired, electrolytic electrodes may also be placed in one or more of the adjacent compartments of the settling and classifying tank. An independent launder 35 is connected at one end with each pair of compartments that are in alinement with the flow of the ore-pulp solution through the mill and toward the tanks below this settling-tank, which I will fully describe hereinafter, and at their opposite ends they connect with a single launder 36, that leads to a tank 37, which I term the "agitating-tank." I place this chemical-ore-pulp-solution-agitating tank on the floor 38 of the mill and below the Chilian mill and the settling and classifying tank 20. The selected charge of settled chemical ore-pulp solution, which is the settled and classified ore-pulp mixed with such amount of the chemical solution as flows with the ore-pulp and was not drawn off from the ore-pulp in the settling and classifying tanks, is mixed with cyanid or any other suitable chemical or chemicals or solutions to restrengthen it to be the same or to be of greater chemical strength than as first used and to make it of the same or of different chemical composition, depending upon the character of the ore being treated. In this agitating-tank I give to this restrengthened chemical ore-pulp solution a continuous agitating and aerating treatment for a predetermined period of time in direct flowing contact with suitable anodes and cathodes, which I operatively connect by suitable circuit-wires, which I will describe more fully hereinafter and which lead to the low-tension electric generator 34. This charge of ore-pulp and restrengthened chemical solution is sufficient to about fill the tank full, and the tanks are preferably made to hold a charge of large tonnage. In practice I have found that an eighty-ton-capacity tank makes a charge that is both practical and economic to handle, while tanks of much larger tonnage capacity may be used, if desired. The chemical ore-pulp solution receives in this tank an agitating and an aerating and electrical precipitation treatment, and I preferably heat all charges of chemical ore-pulp solution that I treat in the agitating-tank until they are warm or very warm or hot, depending on the character of the ore, although, if desired, they may be treated cold. As this agitating, aerating, and electrical precipitation treatment forms the most important part of my process and as the apparatus I employ within this tank is new and novel, I will describe the general construction of its various elements and the character of the agitating, aerating, and electrical precipitation treatment I give the chemical ore-pulp solutions within it. I preferably make this agitating-tank of wood, although, if desired, it may be made of iron or steel. This tank is supported above the floor or foundation level by any suitably-constructed frame. As illustrated, however, it is supported in a frame of timbers 39, which is constructed to rigidly support it in all directions. The upper part of the tank is preferably a straight cylindrical form of tank. Its bottom, however, is conical and slopes and tapers evenly all around from the sides to the axial center of the tank. In the axial center of the conical bottom I form a discharge-aperture 40. Around this discharge-aperture I place a valve-seat 41. This valve-seat comprises a cage-shaped casting, provided with a tubular depending portion that fits in the discharge-aperture. The end of this tubular portion is interiorly threaded to receive suitable pipe-fittings to convey the contents of this tank to other tanks for further treatment or to run it to waste. On the upper side edge of the bottom portion of this valve-seat I form short upward-projecting legs 42 at substantially equal distances apart, which are connected integrally at the top by a flat ring portion 43, in which is secured a spider 44, thus forming open spaces between the legs and the top ring 43 and the conical bottom portion and also through the spider, which permits the contents of the tank to flow into the center of the cage-shaped valve-seat casting and either be discharged or be vertically raised up through its center by the screw propellers, as will be explained hereinafter. This valve-seat casting is secured to the bottom of the tank and to a cap-casting 45, that fits over the inverted apex of the conical bottom. In the valve-seat I fit a valve 46, the top of which is provided with wings that slide on guideway-lugs 47, formed on the inside of the valve-seat. I secure to the valve one end of a stem 48, the opposite end of which extends up through and above the tank. This valve-stem is operated to open and close the valve by a hand-wheel 49, which is threaded to it. The valve-stem is journaled in a box 50, which is secured to the supporting-framework. This valve-stem is surrounded closely but loosely by a tubular shaft 51, which extends from above the tank and near to the hand-wheel of the valve-stem down to the valve-seat casting.

The upper end of the tubular shaft is journaled in vertical boxes 52, which are secured to the supporting-framework. These boxes are provided with transversely-arranged ball bearings 53 in their top ends, and on the shaft collars 54 are secured, which bear on and rotate on each ball-bearing. These collars and ball-bearings take the vertical thrust of the tubular shaft. The shaft terminates above its supporting-boxes, and on its end and around the valve-stem I place a packing-box 55. The lower end of the shaft is supported in the spider at the top of the valve-cage.

Upon the shaft I secure a number of screw-propeller blades 56, which I term "ore-pulp lifting propellers." I preferably place three of these ore-pulp propellers on the shaft, placing one just above the valve-cage and one at about the center of the height of the tank and the third toward its top, and upon the upper part of the shaft above the tank I secure a pulley 57, which is adapted to be connected by a belt to a source of power. Upon the top of the valve-cage I secure the end of a cylindrical casing 58, which I term the ore-pulp's "vertical passage-way and the screw-propeller casing." This cylindrical casing is made to fit loosely but closely over the screw propellers, which rotate within it. The opposite end of this cylinder extends to the top portion of the tank. I preferably make this cylindrical casing in two lengths 59 and 60 and bolt them together. I also preferably make each section in two halves, one-half of each section only being shown in Fig. 3, and secure the half-sections lengthwise together, so as to make a complete cylindrical casing around the screw propellers, and in order to prevent the ore solutions from swirling in the casing I secure to the inside of the casing four plate-shaped ribs 61, which are arranged vertically in the casing and project radially from the casing inwardly to close to the shaft from four equidistant points on the interior of the casing; but only two of these plates are shown in Fig. 3.

To the top of the casing I secure a conical ore-pulp-distributing plate 62, which I term a "deflector," which comprises the joists $62^A$, which extend to and are secured to the walls of the tank, and four removable trap-doors 63, placed upon these joists, in order to provide openings through which the tank may be entered. The tops of these segment-doors are preferably convexed transversely from side to side to conform to the peripheral curve of the cone. This conical ore-pulp distributer is of large enough diameter to nearly fill the top of the tank, only a narrow space being left all around it between its peripheral edge and the walls of the tank.

One of the essential features for the recovery of the precious and other metals from their ores in my process is the electrolytic deposition of the metallic values from the chemical ore-pulp solutions used to extract them from the ores. In carrying out this feature of my process I contemplate the use of any type or character of electrolytic electrodes arranged in any operative order in the tank and connected operatively to the poles of any suitable low-tension electric-current generator, and in the practical operation of my apparatus I preferably carry out this feature of my invention as follows: I form a staging 64, upon which I place suitable anode-supporting frames 65, in which I place suitable anodes 66, and between the anode-frames are suitably supported cathodes 67. The anodes consist of suitable plate-shaped electrodes, and the cathodes consist of suitable plate-shaped electrodes that slide easily in and out of slots formed in insulating-blocks 68, that are secured between the anode-frames 65. I preferably use four groups of anodes and cathodes, and they are placed at the four quarter-points of the tank below the trap-doors of the conical ore-pulp deflector. They are positioned to stand at an angle that will bring the surfaces of the cathodes in the direct path of the ore-pulp as it falls from the peripheral edge of the deflector into the tank. Each cathode is arranged so it can be easily lifted out of its supporting-blocks and out of the tank, as it is necessary to frequently take them out of the tank to remove the metals deposited thereon. The particular character of the cathodes does not form a part of my present invention. I preferably use, however, carbon for the anodes and lead plates for the cathodes, as they are capable of collecting the precious as well as the base metals. From each block of anodes branch circuit-wires 69 are connected with a general circuit-wire 70, which connects with the positive pole of a low-tension electric-current generator 34, and from each block of cathodes branch circuit-wires 71 are connected with a circuit-wire 72, the opposite end of which connects with the negative pole of said generator. These wires are omitted in Fig. 3 to avoid confusion.

I heat the chemical ore-pulp solutions of all charges that are treated in the agitating-tank, first, because the action of the chemical solution is rendered more active and penetrates and decomposes the metallic compounds of the ores quicker than when the solution is cold; second, the electrolytic action of the current passing between the anode and cathode electrodes through the chemical ore-pulp solution is hastened and rendered more complete and positive in its action; third, because the ore-pulp settles quicker and more thoroughly from the hot chemical solution after it is discharged from the agitating-tank into the settling-tanks than from cold solutions, and consequently leaves the chemical solutions clearer of the very finely-comminuted ore-pulp, a certain percentage of which persists in remaining in suspension in the solutions a very long time and is extremely slow in settling from cold solutions, and, fourth, because hot chemical solutions will take up a high percentage of the values of ore-pulp and in less time than cold solutions. In carrying out this feature of my invention I preferably use two groups of return coiled pipes 73 and 74, which I preferably secure to the under side of the anode-supporting staging by straps 73$^A$ and 74$^A$. These coils are connected together at their inner ends by a pipe 75, which extends from one coil to the other. From the outer end of each coil branch pipes 76 and 77 extend out through the opposite sides of the tank. One of these pipes is connected to a source of steam-supply which passes through the coils and exhausts from the other pipe or is led from it to further use. In addition to the use of steam in the pipe-coils I receive considerable additional heat from the electric current passing through the solution between the anodes and cathodes, as the chemical ore-pulp solution flows in a substantially steady stream between the anodes and cathodes and in direct contact with their surfaces.

After treatment in the agitating-tank the chemical ore-pulp solution is run through a Y-shaped pipe or launder 78 into ore-pulp-settling tanks 79 and 80, which rest on the floor 81 of the mill. At the junction of the branches of this Y-shaped launder a gate 82 is hinged to swing from one side to the other and open or close either branch passage-way, so that charges of chemical ore-pulp solution may be run wholly into one of the tanks, while the other tank is held for the next charge from the agitating-tank. The chemical ore-pulp solution that runs into these settling-tanks is allowed to stand until the ore-pulp settles from the chemical solution. The substantially clear chemical solution is then decanted from the tanks into launders 83 and 84 by means of a hose or pipe, which I do not illustrate, or the solution is separated and run off through apertures in which are placed plugs 85 at different levels in the sides of the tanks in positions to discharge into the launders. The solution runs through the launders into a tank 86, which I call the "sump-tank" and which is placed on the floor 87 below the settling-tanks, from which it is pumped by a pump 88 into the stock-solution tank 2, the pump being connected by a suction-pipe 89, which extends into this sump-tank, and also with a delivery-pipe 90, which extends to the stock-solution tank 2. As this chemical solution is very apt to contain and almost always does contain a small percentage of values which the electrodes did not fully extract and collect, I provide the stock-solution tank in all cases where this percentage of values warrants it with suitable operative electrolytic electrodes 91, which I operatively connect by suitable circuit-wires 91$^A$ to the electric-current generator 34.

The settled ore-pulp in the tanks 79 and 80 is discharged through valved apertures in their bottoms into launders 92 and 93 and is conveyed to concentrators 94 and 95 at the lower end of the mill, where it is concentrated to separate and save such remaining particles of the metallic values of the ores as the chemical solutions and the electrolytic action failed to penetrate, decompose, or dissolve and such particles of the free metallic values as did not amalgamate.

The operation is as follows: The various machines are operatively connected together by various power-driven shafts, pulleys, and belts, as shown, to a suitable source of power. The stock-solution tank 2 is then filled with a weak solution of cyanid of potassium, to which may be added any other chemical or chemicals or chemical solutions, if desired. The ore is then fed into the mill from the car 7 and the coarse ore passes over the grizzly 9 to the platform 11, from which it is fed into the rock-breaker and is broken up and crushed into small pieces which fall into the ore-bin 6. The fine ore from the car 7 falls through the grizzly 9 into the bin 6. From the bin the ore is fed into the automatic ore-feeder 12, from which it feeds into the mortar-frame 14$^A$ of the stamps, into which a supply of the cyanid solution is allowed to flow continuously through the pipe 14ᴮ when the stamps are in operation, and the ore is recrushed to any desired degree of fineness in the cyanid solution which is allowed to fill the lower part of the mortar. Consequently the ore when crushed to pass the screens of the mortar is a cyanid ore-pulp solution. This cyanid ore-pulp solution cleans and brightens and otherwise puts any free particles of gold and silver that may be in the ore in condition to amalgamate. The cyanid ore-pulp solution is then run over an amalgamated plate 15 in order that any particles of free gold and silver that settle on the plate will amalgamate with it, and thus be extracted from the cyanid ore-pulp at the beginning of the treatment. The cyanid ore-pulp solution is then run into the Chilian mill 18 and is reground to a finer product than the stamps produced. From the Chilian mill the cyanid ore-pulp solution is run over the amalgamated plate 19, from which it is discharged into my improved form of settling and classifying tank 20, where suitable chemicals are added that will thoroughly eliminate any deleterious acid salts the ore-pulp may contain that would interfere with the full action of the cyanid solution. The ore-pulp as it flows into the settling and classifying tank flows from one compartment to another and the ore-pulp is settled from the cyanid solution and the cyanid solution is pumped back to the stock-solution tank 2. The ore-pulp as it settles from the solution is divided and classified into different sizes by gravity, from the coarsest particles in the ore-pulp to the finest slimes, the heaviest particles settling into the first compartment and the next largest into the second, and so on, to the finest and lightest slimes, which will be the last to settle. A sufficient quantity of the different classified sizes of the settled ore-pulp with such amount of solution as is drawn from the respective compartments with them to make a fixed charge of the required tonnage quantity to fill the agitator-tank is then run through the launders 35 and 36 into the chemical ore-pulp-agitating tank 37 to make a fixed charge of the required constituency. To this fixed charge of cyanid ore-pulp solution is then added cyanid of potassium or a compound of cyanid of potassium to restrengthen the cyanid ore-pulp solution and, if desired, other chemicals may be added to the cyanid ore-pulp solution. This restrengthened cyanid ore-pulp solution may be of the same strength or may be of greater strength than the cyanid ore-pulp solution in which the ore is crushed, and it may consist of a purely cyanid-of-potassium solution or of a cyanid and other chemical solution or of other chemical solutions than cyanid, as my process contemplates the use of any one or of all chemicals or chemical compounds that possess the property of dissolving and decomposing the metallic compounds of ores and of assisting and hastening the electrolytic decomposition of the metallic values and the collection of the same on suitable electrodes.

The charge should fill the tanks up close to the under side of the aerating surface or chemical ore-pulp-solution deflector and in a charge of eighty tons the ore, if dry, would weigh about thirty tons and the chemical solution would weigh about fifty tons. Power is then applied to the propeller-shaft and the chemical ore-pulp solution is drawn into the cage and moved bodily upward through the channels formed between the partition-plates in the casing by the screw-propeller blades and is distributed over the entire circumferential surface of the conical deflector in a thin stream, which drops from the peripheral edge of the conical deflector through the circumferential space between it and the walls of the tank into the body of the chemical ore-pulp solution in the tank, which flows in a continuous stream down through the anodes and cathodes, flowing in contact with the cathodes without attrition and giving the electric current flowing between the anodes and cathodes the most perfect conditions obtainable to decompose the metallic compounds of the ores and to collect and deposit the metals from the chemical ore-pulp solution and at the same time to purify and regenerate the cyanid and other solutions, which result is attained by the following equation, which is based on an electric current supply of from about .05 to two amperes with a potential difference of from about seven to ten volts, which I have found in practice is ample for the electrolytic recovery of the metallic values of most ores:

$$4Au + 8KCn + 4H_2O + 2O_2 =$$

$$4KAuCn_2 + 4KOH + 2H_2O + O_2$$

$$4KAuCn_2 + 4KOH + 2H_2O + O_2 + \text{Current} =$$

$$(4Au) + \underset{\text{Cath}}{(4K)} + \underset{\text{Anode}}{(8Cn)} + 2H_2O + O_2 + 4KOH =$$

$$(4Au) + \underset{\text{Anode}}{(8Cn)} + 8KOH =$$

$$\underset{\text{Cath}}{(4Au)} + \overset{\text{Solution}}{(8KOH + 8Cn)} =$$

$$\underset{\text{Cath}}{(4Au)} + 8KCn + 4H_2O + 2O_2$$

Consequently the chemical solution is regenerated and purified, and by the chemical reaction is made practically as pure, strong, and active after treatment in the tank with a charge of ore-pulp as when it was first made up in the tank at the commencement of treatment.

Each charge in the agitating-tank is treated from about two hours to about twelve hours. Usually with most ores that I have experimented with from two to eight hours is sufficient to make a recovery of from about eighty-five to about ninety-eight per cent. of their gold and silver values. Occasionally, however, very rebellious and refractory ores of the tellurium sulfid class require several hours' longer treatment. The cathodes collect upon their surfaces the gold, silver, and other metallic values, and they are frequently removed from the tank through the trap-doors of the conical deflector, and the gold and silver is removed from them, and they are cleaned and then replaced in the tank.

My process differs from all others in the lowing respects:

First. I start a chemical action that puts the free mineral particles of the ore-pulp in condition to amalgamate, and that prepares the ore for electrolytic action by recrushing and grinding and pulverizing the ores in a weak solution of cyanid or other chemical solution or in cyanid and other chemical solutions that are particularly adapted for this purpose. I then carry the resulting chemical ore-pulp solution through a series of steps that give it time to penetrate and dissolve the simpler metallic compounds of the ores and also to eliminate from the chemical solution all deleterious acid salts, and I remove a large percentage of the metallic values thus liberated and dissolved by amalgamation after recrushing when stamps are used and again after grinding or regrinding and pulverizing the ores and by the use of electrolytic electrodes in the settling and classifying tank, thus removing a portion of the values before the refractory and rebellious complex compounds which the ore may contain, and which being penetrated and saturated and dissolved by this weak chemical solution are brought to a condition for a more vigorous chemical and electrolytic treatment in the agitating-tank that is better adapted to complete their decomposition and extraction and the recovery of their metallic values.

Second. The commonly-used cyanid processes for extracting gold from its ores are leaching processes, and the slimes product of finely-pulverized ores packs so dense in many ores that the cyanid solutions do not properly percolate and saturate them, which results in loss of values, as it is well known that the greater portion of losses by leaching cyanid methods is due to imperfect agitation of the ore-pulp and the failure to recover a high percentage of the values in the slimes product. In my process I do not leach the ores by percolation, and the slimes product of finely-pulverized ores is the easiest treated product I have to contend with, as under my rapid continuous endless-stream method of agitation, aeration, and electrical precipitation it yields its values quicker and more fully than the coarser recrushed or ground products of ore. My process differs from all other processes and methods, inasmuch as the slimes and all grades of sizes of the ore-pulp are kept in such rapid continuous endless-stream movement that the mass is of a perfectly even and uniform fluid consistency throughout, and is in consequence thereof the best possible attainable electrolyte.

Third. In cyanid and other chemical processes as at present practiced the slimes product carries away the values, and they are further treated to recover their values by concentration, which does not result satisfactorily, as the slimes float on the water and carry a large percentage of their values over the tables with them, while in my process I extract the values from the slimes in the agitating-tank, and the ore-pulp is concentrated to recover the coarse particles of mineral that were too large and dense for the solution to penetrate, and a high percentage of such values as remain in the ore-pulp after treatment in the agitation-tank is easily recoverable by concentration.

While I have illustrated an ore-treating plant embodying the preferred type and arrangement of machinery I preferably use to carry my process into practical operation, I do not wish to be limited to the character and arrangement of the machinery shown, as my process can be applied to many mills and ore-treating plants at present in operation that are arranged differently from the one I have illustrated, but which contain enough of the different machine elements that I use to be easily adapted to it with but slight additional apparatus and expense, and in the practice of my process I do not wish to be limited to all the steps herein set forth, as some ores do not require all of the different steps of treatment herein enumerated.

My process therefore contemplates, broadly:

First, the formation of a chemical ore-pulp solution in the ore recrushing, grinding, and pulverizing machinery suitable for preparing the ore-pulp for amalgamation and for electrolytic action by further treatment and the recovery of such portion of the values from this preparation of chemical ore-pulp solution as can be recovered by amalgamation, and also the recovery of a percentage of the values of the simpler compounds of the ore in the settling and classifying tank as has been dissolved by this preparatory chemical ore-pulp solution by suitable electrolytic electrodes, and also the elimination of any deleterious action of the salts or acids that may exist in this preparatory chemical ore-pulp solution that tend to impair or foul the solvent action of cyanid or other chemicals and the return and continuous reuse of this chemical solution in the ore recrushing, grinding, and pulverizing machinery. The above is the first complete step of the process, and I call it the "chemical preparatory treatment," as it starts and sets up a chemical action that prepares the ore for the intense electrolytic treatment that follows in the agitator, and which I call the "second step," which is as follows:

Second, the treatment of fixed quantitative charges of ore-pulp in a restrengthened chemical ore pulp solution of cyanid or of any other suitable chemical or chemicals or of cyanid and other chemicals for a predetermined period of time in a tank where the chemical ore-pulp solutions are kept in very rapid continuous movement in an endless flowing stream during the movement of which ore-pulp it is spread out into a very thin conical-shaped stream in direct and continuous contact with the atmosphere and of flowing this continuous endless moving stream of ore-pulp in contact with the anode and cathode surfaces of suitable electrolytic electrodes that are arranged and adapted to collect the metallic values from the chemical ore-pulp solutions and of regenerating and purifying the chemical solutions during the treatment of the charges and the separation of the ore-pulp from the solution by settling the ore-pulp and by decanting or separating the solution from the ore-pulp, thus clarifying the solution and the return of the clarified solution to the stock-solution tank and its addition to the original preparatory solution and its continuous reuse in the ore recrushing, grinding, and pulverizing machinery to reduce the ore therein to the required degree of fineness to provide a continuous supply of chemical ore-pulp solution and the extraction from the solution in the stock-solution tank by suitable electrolytic electrodes of such remaining metallic values as it may contain and the further treatment of the settled ore-pulp by concentration, in case particles of mineral are present in it that were not extracted and recovered by the preceding steps of the process.

Having described my improved process for treating ores, what I claim as new, and desire to secure by Letters Patent, is—

1. The process of treating auriferous and argentiferous ores, which consists in mixing the ore with a cyanid solution, continuously aerating the mixture by lifting portions and distributing them in contact with the atmosphere, and simultaneously passing an electric current through the body of the mixture to deposit the metals in solution.

2. The process of treating auriferous and argentiferous ores, which consists in mixing the ore with a cyanid solution, continuously aerating the mixture by lifting portions and moving them in a thin sheet in contact with the atmosphere, and simultaneously passing an electric current through the body of the mixture to deposit the metals in solution.

3. The process of treating auriferous and argentiferous ores, which consists in mixing the ore with a cyanid solution, continuously aerating the mixture by lifting portions and moving them in a thin sheet in contact with the atmosphere, and recovering the metals in solution by circulating the body of the mixture in contact with electrodes which are arranged at an angle to the direction of flow.

4. The process of treating auriferous and argentiferous ores, which consists in crushing broken ore in a weak cyanid solution, amalgamating the resulting pulp, settling and classifying the ore from the solution and returning the clear solution to the crusher, selecting from the different sizes of settled and classified ore a suitable charge of ore, retaining such quantity of solution as flows with them, agitating and moving said charge in a continuous stream and distributing it at one point in a thin sheet in contact with the atmosphere, recovering the metals in solution by passing said stream in contact with electrodes, settling the residues and returning the clear solution to the crusher.

5. The herein-described process of extracting gold, silver and other metals from ores, which consists in recrushing broken ore with a weak solution of cyanid, then amalgamating said recrushed cyanid ore-pulp solution, then grinding and pulverizing said recrushed cyanid ore-pulp solution, then reamalgamating, then agitating and moving said cyanid ore-pulp solution in a continuous stream and distributing it at one part of its movement in a thin stream in direct contact with the atmosphere, then positioning in the path of said continuously-moving stream of cyanid ore-pulp solution operatively-arranged electrolytic electrodes in such a manner that said continuously-flowing stream of cyanid ore-pulp solution flows in an oblique vertical angle in contact with said electrolytic electrodes, then returning the clear cyanid solutions to be reused continuously to recrush, grind and pulverize new supplies of ore in, then concentrating the remaining ore-pulp.

6. The herein-described process of extracting gold and other metals from ores, which consists in recrushing and pulverizing the ores in suitable chemical solutions, to a finely ground or pulverized suitable chemical ore-pulp solution, and continuously using said solution over again, and in settling and classifying and storing the ore as it is made into chemical ore-pulp solution, then subjecting the stored ore solutions to the action of suitable electrodes, then drawing from said settled and classified ore-pulp solution, charges of predetermined amounts, and then coöperatively agitating and aerating said chemical ore-pulp solutions by rapidly moving them in a continuous stream, and distributing said stream at one point in its movement in a thin stream in direct contact with the atmosphere, and then flowing said continuous endless moving stream in contact with operatively-arranged electrolytic electrodes, then settling said suitable chemical solutions, then returning the chemical solutions to be reused with a new supply of ore, and then concentrating the remaining ore-pulp.

7. The herein-described process of extracting gold, silver and other metals from ores, which consists in continuously reducing ore to a finely-pulverized condition in a continuously-flowing body of chemical solution adapted to decompose their metallic compounds, and then agitating and aerating said chemical solution, in charges of predetermined volume, by moving them rapidly in a continuous endless stream in direct contact with the atmosphere, then separating the gold and other metals from said chemical solution, by moving said continuous-moving stream in direct contact with operatively-arranged electrolytic anodes and cathodes, then settling the ore from the solution, and treating the chemical solution, to the action of electrolytic electrodes adapted to collect the metallic values therefrom, and then reusing said chemical solution, to reduce new supplies of ore in, to form new supplies of chemical ore-pulp solution, and then concentrating the remaining ore-pulp.

8. The herein-described process of extracting from ores their metallic values, which consists in reducing the ores to the desired degree of fineness in a cyanid solution that is adapted to put the free gold and silver particles in condition to amalgamate, then amalgamating the resulting chemical ore-pulp solutions, then settling and classifying said ore-pulp out of said chemical solution, then returning said solution to the stock-solution tank and continuously reusing it, to provide a continuous supply of chemical ore-pulp solution, then drawing a charge of a predetermined quantity of said settled ore-pulp, said charge consisting of predetermined amounts of the different grades of said classified ore-pulp, together with such amounts of solution as permeates the ore-pulp and that flows with it, then mixing in said charge of settled and classified cyanid ore-pulp solution enough cyanid of potassium to restrengthen it to meet the requirements of the ore being treated, then rapidly moving said charge of cyanid ore-pulp solutions in an endless continuous stream in direct contact with operatively-arranged electrolytic electrodes, and then distributing said solutions at one point of its endless movement in a thin conical-shaped stream in contact with the atmosphere, then separating the ore from the cyanid solution, then returning said separated cyanid solution to the remainder of the original supply of cyanid solution, to be reused, then concentrating the remaining ore-pulp.

9. The herein-described process of extracting the precious metals from their ores, which consists of first recrushing the ore to the required degree of fineness in a body of weak cyanid solution to form a cyanid ore-pulp solution, then subjecting said cyanid ore-pulp solution to an amalgamation treatment, then pulverizing said cyanid ore-pulp, then amalgamating said pulverized cyanid ore-pulp, then settling and classifying said ore-pulp from said cyanid ore-pulp solution, and storing said settled and classified portion of said cyanid ore-pulp solution, then subjecting said classified cyanid solution to the action of suitable electrolytic electrodes adapted to extract its metallic values, then reusing said cyanid solutions continuously to crush ore in, to form a continuous supply of cyanid ore-pulp solution, then drawing from said stored, settled and classified cyanid ore-pulp, a charge of predetermined quantities of the different classified sizes of the said settled ore-pulp, together with a sufficient amount of the cyanid solution to make a charge of the desired quantity, then mixing with said predetermined quantity of ore-pulp new cyanid enough to restrengthen said cyanid ore-pulp solution, to meet the requirements of the ore under treatment, then agitating such charge continuously for a predetermined period of time by moving it in a continuous flowing endless stream, and distributing said flowing stream at one point of its endless movement in a thin conical-shaped stream in contact with the atmosphere, then placing in the path of said agitated endless flowing stream of cyanid ore-pulp solution, a plurality of electrolytic electrodes arranged and adapted to extract its precious metals, then clarifying said cyanid ore-pulp solution by settling the ore-pulp from the cyanid solution, then introducing suitable electrolytic electrodes in said clarified cyanid solution adapted to extract any remaining precious metals, then reusing said clarified solution to crush fresh supplies of ore in, to form a continuous supply of cyanid ore-pulp solution, then running the remaining ore-pulp to waste or to further treatment.

10. The herein-described process of extracting the precious metals from their ores, which consists of first recrushing the ore to the desired degree of fineness in a body of weak cyanid solution to form a cyanid ore-pulp solution, then subjecting said cyanid ore-pulp solution to an amalgamation treatment, then pulverizing said cyanid ore-pulp, then amalgamating said pulverized cyanid ore-pulp, then settling and classifying said ore-pulp from said cyanid ore-pulp solution, and storing said settled and classified portion of said cyanid ore-pulp solution, then subjecting said classified cyanid solution to the action of suitable electrolytic electrodes adapted to extract its metallic values, then reusing said cyanid solutions continuously to crush ore in, to form a continuous supply of cyanid ore-pulp solution, then drawing from said stored, settled and classified cyanid ore-pulp, with such amount of solution as flows from it, charges of predetermined quantities of different classified sizes of said settled ore-pulp, together with enough solution to make a charge of the desired consistency and quantity, then mixing with said predetermined charge of ore-pulp, new cyanid enough to restrengthen said cyanid ore-pulp solution, to meet the requirements of the ore under treatment, then agitating such charge continuously for a predetermined period of time by moving it in a continuous flowing endless stream, and distributing said flowing stream at one point of its endless movement in a thin sheet in contact with the atmosphere, then placing in the path of said agitated endless flowing stream of cyanid ore-pulp solution, a plurality of electrolytic electrodes arranged and adapted to extract its precious metals, then clarifying said cyanid ore-pulp solution by separating the ore-pulp from the cyanid solution, then introducing suitable electrolytic electrodes in said clarified cyanid solution adapted to extract remaining precious metals, then returning and adding said clarified solution to the original supply of weak cyanid solution to be reused in the continuous recrushing, grinding and pulverizing of ores to form a continuous supply of cyanid ore-pulp solution, then concentrating the settled ore-pulp.

11. The herein-described process for treating ores to extract their gold, silver and other metallic values, which consists of first forming a weak chemical electrolytic cyanid ore-pulp solution as a preparatory chemical agent for the electrolytic deposition of the metallic values of ores by subsequent electrolytic treatment, then restrengthening said cyanid ore-pulp solution and treating quantitative charges for periods of time sufficient to extract their gold, silver and other metallic values by agitation, which consists of moving each charge in a continuous endless stream, and by aeration, which consists of separating said continuous endless stream of ore-pulp at one point in its movement into a thin sheet in direct contact with the atmosphere, and by moving each charge in direct contact with operatively positioned and arranged electrolytic electrodes adapted to collect the gold, silver and other metallic values from said cyanid ore-pulp solution, then clarifying the cyanid ore-pulp solution by settling the ore-pulp from the chemical solution, then reusing the clarified cyanid solution, then running the remaining ore-pulp to waste or to further treatment by concentration.

In testimony whereof I affix my signature in presence of two witnesses.

WILBUR A. HENDRYX.

Witnesses:
  G. SARGENT ELLIOTT,
  BESSIE THOMPSON.